US009955480B2

United States Patent
Maciel et al.

(10) Patent No.: US 9,955,480 B2
(45) Date of Patent: Apr. 24, 2018

(54) METHOD AND APPARATUS FOR RESOURCE ALLOCATION SATISFYING MULTIPLE PERFORMANCE CONSTRAINTS

(71) Applicant: Telefonaktiebolaget L M Ericsson (publ), Stockholm (SE)

(72) Inventors: Tarcísio Maciel, Fortaleza (BR); Francisco Rodrigo Porto Cavalcanti, Fortaleza (BR); Walter da Cruz Freitas, Jr., Fortaleza (BR); Francisco Rafael Marques Lima, Fortaleza (BR); Emanuel B. Rodrigues, Fortaleza (BR); Nibia Sousa Bezerra, Fortaleza (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 14/441,285

(22) PCT Filed: Nov. 13, 2013

(86) PCT No.: PCT/SE2013/051339
§ 371 (c)(1),
(2) Date: May 7, 2015

(87) PCT Pub. No.: WO2014/077769
PCT Pub. Date: May 22, 2014

(65) Prior Publication Data

US 2015/0289272 A1 Oct. 8, 2015

Related U.S. Application Data

(60) Provisional application No. 61/726,412, filed on Nov. 14, 2012.

(51) Int. Cl.
*H04W 72/04* (2009.01)
*H04W 72/08* (2009.01)

(52) U.S. Cl.
CPC ..... *H04W 72/0453* (2013.01); *H04W 72/087* (2013.01)

(58) Field of Classification Search
None
See application file for complete search history.

(56) References Cited

U.S. PATENT DOCUMENTS 7,911,934 B2 3/2011 Wong et al.
2007/0297386 A1* 12/2007 Zhang ........................ H04L 5/06 370/344

(Continued)

FOREIGN PATENT DOCUMENTS

WO 2014077768 A1 5/2014

OTHER PUBLICATIONS

Myung, H., et al., "Single Carrier FDMA for Uplink Wireless Transmission", IEEE Vehicular Technology Magazine, 2006-090-01, pp. 30-38, IEEE.

(Continued)

*Primary Examiner* — Suk Jin Kang
(74) *Attorney, Agent, or Firm* — Coats & Bennett, PLLC

(57) ABSTRACT

A low-complexity, efficient Radio Resource Allocation method performed by a base station of a wireless communication network allocates a first plurality of frequency resources among a second plurality of requesting mobile terminals. Each mobile terminal employs a service such that two or more services are represented in the second plurality. The RRA method satisfies all of an exclusivity constraint that each frequency resource is allocated to only one mobile terminal, an adjacency constraint that all frequency resources allocated to any given mobile terminal are contiguous in a frequency domain, and a minimum service requirement constraint that a predetermined number of the mobile terminals employing each service be granted a (Continued)

required data rate. The RRA method comprises two phases: Unconstrained Maximization and Reallocation. In the Unconstrained Maximization phase, frequency resources are iteratively allocated to mobile terminals in an opportunistic way, obeying the exclusivity and adjacency constraints but without concern for the minimum service requirement constraint; the resulting allocation is tested for fulfillment of the minimum service requirement constraint; and one or more mobile terminals are removed from the allocation based on the minimum service requirement constraint test. In the Reallocation phase, frequency resources from one or more mobile terminals that have their required data rate fulfilled are reallocated to one or more mobile terminals that do not have their required data rate fulfilled.

21 Claims, 11 Drawing Sheets

(56) References Cited

U.S. PATENT DOCUMENTS

2008/0013599 A1 1/2008 Malladi
2008/0080545 A1* 4/2008 Wong .................. H04L 27/2608 370/437
2009/0073929 A1 3/2009 Malladi et al.
2009/0161612 A1* 6/2009 Liu ....................... H04L 5/0032 370/329
2009/0163218 A1* 6/2009 Liu ...................... H04B 7/2606 455/450
2010/0312894 A1 12/2010 Awad et al.
2011/0013092 A1* 1/2011 Chung .................. H04W 16/06 348/732
2011/0065446 A1 3/2011 Mueck
2011/0117948 A1* 5/2011 Ishii ...................... H04L 5/0007 455/509
2011/0183697 A1* 7/2011 Akimoto ............... H04L 5/0007 455/509
2011/0275399 A1* 11/2011 Englund ........... H04W 72/1231 455/513
2012/0008591 A1* 1/2012 Miki ....................... H04J 13/16 370/330
2012/0093095 A1* 4/2012 Barbieri ............ H04W 72/0426 370/329
2012/0134275 A1 5/2012 Choi et al.
2012/0243488 A1* 9/2012 Gupta ............... H04W 72/0426 370/329
2012/0314674 A1 12/2012 Seo et al.
2013/0010720 A1 1/2013 ohr et al.
2013/0044697 A1* 2/2013 Yoo ..................... H04W 72/082 370/329
2013/0070724 A1 3/2013 Malladi
2013/0142062 A1 6/2013 Dinan
2013/0163553 A1 6/2013 Lee et al.
2013/0170468 A1* 7/2013 Baker ................ H04W 72/085 370/330
2013/0182627 A1 7/2013 Lee et al.
2013/0215819 A1 8/2013 Ji et al.
2013/0336259 A1 12/2013 Awad et al.
2014/0192759 A1 7/2014 Son et al.
2014/0247795 A1* 9/2014 Kim .................... H04W 72/042 370/329
2014/0301329 A1 10/2014 Kim et al.
2014/0321439 A1* 10/2014 Choi ..................... H04L 5/0023 370/336
2014/0342746 A1* 11/2014 Nakashima ........... H04L 5/0048 455/450
2014/0369217 A1* 12/2014 Kim ...................... H04W 16/12 370/252
2015/0078284 A1 3/2015 Lee et al.
2015/0085806 A1 3/2015 Dinan
2015/0155928 A1 6/2015 Seo et al.
2015/0208387 A1 7/2015 Awad et al.
2015/0223263 A1 8/2015 Soong et al.
2015/0256306 A1 9/2015 Kim et al.
2015/0257164 A1 9/2015 Lim et al.
2015/0264669 A1 9/2015 Kim et al.
2016/0029403 A1* 1/2016 Roy .................. H04W 72/0406 370/336
2016/0044687 A1 2/2016 Mueck et al.
2016/0254847 A1* 9/2016 Choi ..................... H04L 5/0023

OTHER PUBLICATIONS

Lima, F., et al., "Scheduling for Improving System Capacity in Multiservice 3GPP LTE", Research Article, Journal of Electrical and Computer Engineering, Article ID 819729, Jan. 1, 2010, pp. 1-16, Hindawi Publishing Corporation.

Wong, I., et al., "Optimal Resource Allocation in Uplink SC-FDMA Systems", Transactions Letters, IEEE Transactions on Wireless Communications, May 1, 2009, pp. 2161-2165, vol. 8, No. 5, IEEE.

* cited by examiner

METHOD AND APPARATUS FOR RESOURCE ALLOCATION SATISFYING MULTIPLE PERFORMANCE CONSTRAINTS

This application is the National Stage of International Application No. PCT/SE2013/051339, filed Nov. 13, 2013, which claims the benefit of U.S. Provisional Application 61/726,412, filed Nov. 14, 2012, the disclosures of each of which are incorporated herein by reference in their entirety.

TECHNICAL FIELD

The present invention relates generally to Radio Resource Allocation, and in particular to a two-phase method of resource allocation to satisfy exclusivity, adjacency, and minimum service requirement constraints.

BACKGROUND

Mobile communication networks are ubiquitous in many parts of the world. Third- and fourth-generation mobile networks utilize Radio Frequency (RF) transmissions in a Radio Access Network (RAN) to effect voice and data communications between geographically dispersed network nodes (Base Stations or BSs) and a large number of mobile communication terminals (Mobile Terminals, or MTs). In order to successfully transmit data between MTs and their serving BSs, radio resources are assigned to the communication links in both downlink (BS to MT) and uplink (MT to BS) directions. Power, times slots and frequency segments are examples of scarce radio resources available at the radio interface. Radio Resource Allocation (RRA) is a key functionality of mobile networks since it is responsible for the management of the scarce resources available in the radio access part of the mobile networks.

In addition to the physical limitation of the available resources, the demand for higher data rates is continuously increasing, motivated by new service applications and mobile devices such as smartphones and tablets. Mobile network operators should therefore be capable of providing sustainable levels of Quality of Service (QoS) to different service applications with heterogeneous requirements. In this context, efficient RRA is highly desired.

The 3rd Generation Partnership Project (3GPP), a wireless communication standards body, has chosen Single Carrier-Frequency Division Multiple Access (SC-FDMA) as the multiple access technology for the uplink of Long Term Evolution (LTE) networks. One reason for adopting SC-FDMA is its property of controlling Peak-to-Average Power Ratio (PAPR). Signals with high PAPR place a significant burden on MTs, due to the need for highly linear power amplifiers to avoid excessive signal distortion. For more information, see the paper by H. G. Myung, J. Lim, and D. J. Goodman, titled “Single Carrier FDMA for Uplink Wireless Transmission,” published in IEEE Vehicular Technology Magazine, vol. 1, no. 3, pp. 30-38, September 2006, the disclosure of which is incorporated herein by reference in its entirety.

The SC-FDMA multiple access scheme imposes two constraints on resource assignment: exclusivity and adjacency. With the exclusivity constraint, a given frequency resource—such as a set of one or more adjacent OFDM subcarriers—should not be shared by multiple MTs within a cell. In other words, each frequency resource should be assigned to at most one MT within a cell to prevent intra-cell interference. In the adjacency constraint, if multiple frequency resource blocks are allocated to a given MT for transmission, they should all be adjacent in the frequency domain, so as to obtain benefits in terms of PAPR. The adjacency constraint significantly reduces the freedom in RRA compared to other multiple access schemes.

Mobile network operators measure system performance in general by means of minimum user satisfaction constraints for each provided service type. More specifically, system operators require that a certain fraction of the connected MTs of each service be satisfied with the provided QoS—referred to herein as the minimum service requirement constraint for each service. For more information, see the paper by F. R. M. Lima, S. Wänstedt, F. R. P. Cavalcanti, and W. C. Freitas, titled “Scheduling for Improving System Capacity in Multiservice 3GPP LTE,” published in Journal of Electrical and Computer Engineering, no. 819729, 2010, the disclosure of which is incorporated herein by reference in its entirety. In particular, a need exists in the art to perform efficient RRA that fulfills the minimum satisfaction guarantees for each provided service in the uplink of SC-FDMA systems.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a low-complexity, efficient RRA method fulfills the minimum service requirement constraint for each provided service in the uplink of e.g. SC-FDMA systems. The RRA method comprises two phases: Unconstrained Maximization and Reallocation. In the Unconstrained Maximization phase, an efficient initial resource allocation is found in terms of spectral efficiency, without guaranteeing QoS or minimum service requirement constraints. In the Reallocation phase, frequency resources are switched between data-rate-satisfied and -unsatisfied MTs in order to fulfill minimum service requirement constraints. In both phases, the method considers the adjacency constraints. As used herein, one example of a frequency resource is a set of contiguous subcarriers.

One embodiment relates to a two-phase Radio Resource Allocation method, by a base station of a wireless communication network, of allocating a first plurality of frequency resources among a second plurality of requesting mobile terminals. Each mobile terminal employs a service, such that two or more services are represented in the second plurality. The frequency resource allocation satisfies all of an exclusivity constraint that each frequency resource is allocated to only one mobile terminal, an adjacency constraint that all frequency resources allocated to any given mobile terminal are contiguous in a frequency domain, and a minimum service requirement constraint that a predetermined number of the mobile terminals employing each service be granted a required data rate. An Unconstrained Maximization phase of the method is executed first, followed by a Reallocation phase of the method. In the Unconstrained Maximization phase, frequency resources are iteratively allocated to the mobile terminals in an opportunistic way, obeying the exclusivity and adjacency constraints but without concern for the minimum service requirement constraint. The resulting allocation is tested for fulfillment of the minimum service requirement constraint. Based on the minimum service requirement constraint test, one or more mobile terminals are removed from the allocation. In the Reallocation phase of the method, frequency resources are reallocated from one or more mobile terminals that has its required data rate fulfilled to one or more mobile terminals that does not have its required data rate fulfilled.

Another embodiment relates to a base station operative in a wireless communication network. The base station is operative to allocate a first plurality of frequency resources among a second plurality of requesting mobile terminals, wherein each mobile terminal employs a service such that two or more services are represented in the second plurality. The frequency resource allocation satisfies three constraints: an exclusivity constraint that each frequency resource is allocated to only one mobile terminal; an adjacency constraint that all frequency resources allocated to any given mobile terminal are contiguous in a frequency domain; and a minimum service requirement constraint that a predetermined number of the mobile terminals employing each service be granted a required data rate. The base station includes a transceiver operative to exchange signaling messages with each requesting mobile terminal. The base station also includes memory and a controller operatively coupled to the memory. The controller is operative, in an Unconstrained Maximization phase of a method, to iteratively allocate frequency resources to the mobile terminals in an opportunistic way, obeying the exclusivity and adjacency constraints but without concern for the minimum service requirement constraint; test the resulting allocation for fulfillment of the minimum service requirement constraint; and remove one or more mobile terminals from the allocation based on the minimum service requirement constraint test. The controller is further operative, in a Reallocation phase of the method following the Unconstrained Maximization phase, to reallocate frequency resources from one or more mobile terminals that have their required data rate fulfilled to one or more mobile terminals that do not have their required data rate fulfilled.

Yet another embodiment relates to a non-transient computer readable media storing program instructions operative to allocate a first plurality of frequency resources among a second plurality of requesting mobile terminals, wherein each mobile terminal employs a service such that two or more services are represented in the second plurality. The frequency resource allocation satisfies all of an exclusivity constraint that each frequency resource is allocated to only one mobile terminal, an adjacency constraint that all frequency resources allocated to any given mobile terminal are contiguous in a frequency domain, and a minimum service requirement constraint that a predetermined number of the mobile terminals employing each service be granted a required data rate. The program instructions are operative to cause a controller, in an Unconstrained Maximization phase of a method, to iteratively allocate frequency resources to the mobile terminals in an opportunistic way, obeying the exclusivity and adjacency constraints but without concern for the minimum service requirement constraint; test the resulting allocation for fulfillment of the minimum service requirement constraint; and remove one or more mobile terminals from the allocation based on the minimum service requirement constraint test. The program instructions are further operative to cause a controller, in a Reallocation phase of the method following the Unconstrained Maximization phase, to reallocate frequency resources from one or more mobile terminals that have their required data rate fulfilled to one or more mobile terminals that do not have their required data rate fulfilled.

Embodiments herein disclose a resource allocation to improve the efficiency in the use of the system resources while satisfying the minimum service requirement constraints considering multiple services and resource adjacency constraint present in e.g. uplink SC-FDMA systems. The disclosed methods herein provide a good complexity/performance trade-off to the solution this problem.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
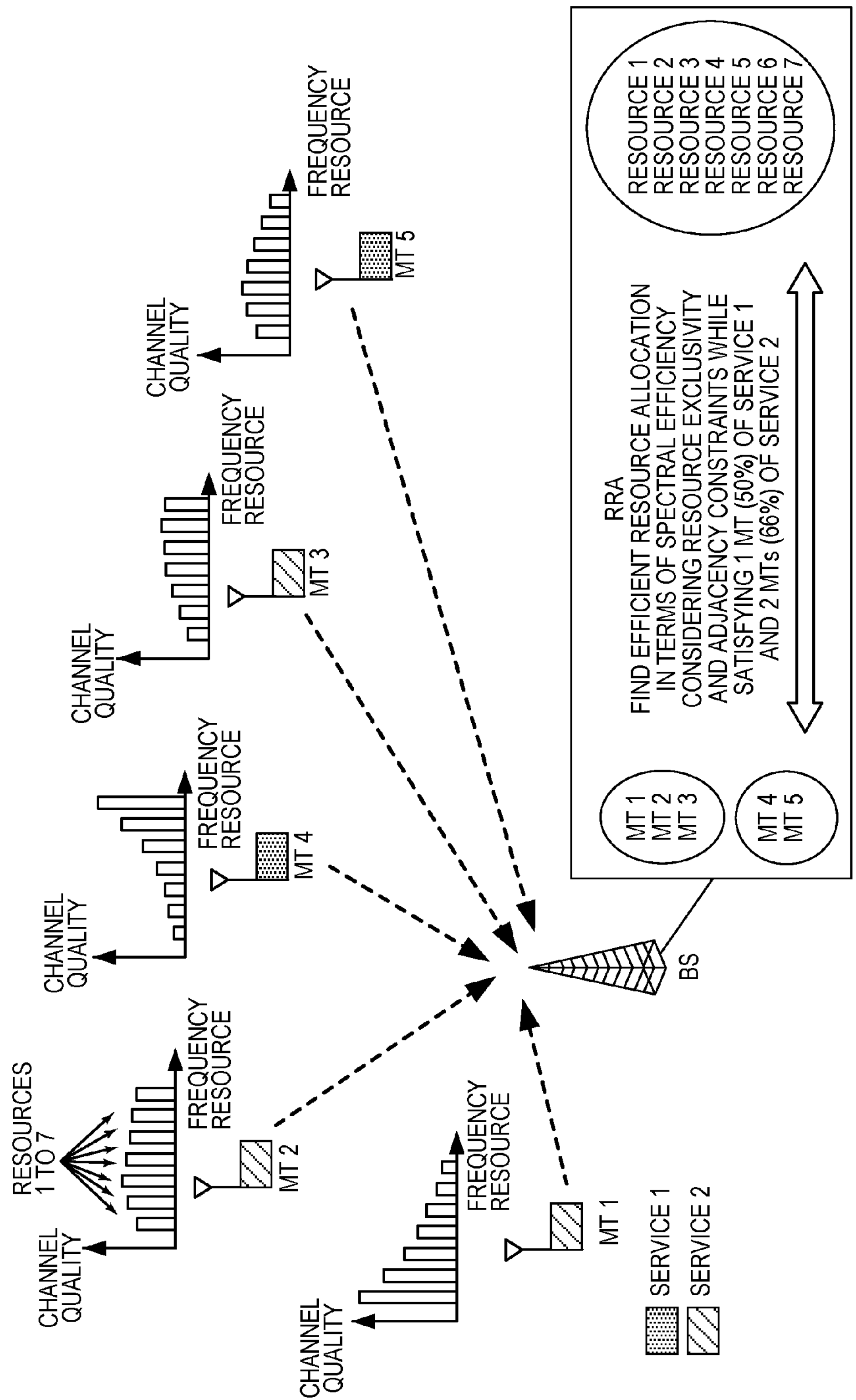
FIG. 1 is a simplified block diagram of an SC-FDMA uplink for five MTs engaged in two services.

FIG. 1 depicts part of a Radio Access Network (RAN) of a wireless communication network. The RAN comprises a base station (BS) receiving uplink communications from five mobile terminals (MT), each engaging in one of two different wireless communication network services. Examples of different services include (but are not limited to) voice calls, Short Message Service (SMS, also known as "texting"), multi-party voice calls (conferencing), Voice over IP (VoIP, also known as "push to talk" or PTT), image transfer, web browsing, email, audio/video streaming, interactive gaming, and videoconferencing. In this example, MTs 1 to 3 engage in service 2 while MTs 4 and 5 engage in service 1.

In general, each MT will experience a different channel quality at any given time. Graphs associated with each MT depict a snapshot of the instantaneous channel quality state on each frequency resource. In this simplified example, seven frequency resources are depicted. As depicted in the graph, MT1 experiences a high channel quality on the lower-frequency resources, and a low channel quality on the higher-frequency resources. In contrast, MT4 experiences a low channel quality on the lower-frequency resources, and a higher channel quality on the higher-frequency resources. MT2, MT3, and MT5 experience roughly comparable channel quality on all seven frequency resources.

As discussed above, wireless communication system operators maintain minimum service requirements, requiring that a certain fraction of the connected MTs of each service be satisfied with the provided Quality of Service (QoS). In the example depicted in FIG. 1, for reasons of service prioritization and/or system capacity, the system operator has defined a minimum number of MTs that should have their QoS requirements fulfilled for each service. In particular, the minimum service requirement for service 1 is 50% participation. This means at least one of MT4 and MT5 must receive service 1 with the requisite QoS. The minimum service requirement for service 2 is 66% participation. This means at least two of MT1, MT2, and MT3 must receive service 2 with the requisite QoS.

The problem to be solved by the Radio Resource Allocation (RRA) functionality is to find a resource allocation that, besides being efficient in terms of spectral efficiency, also satisfies the minimum number of MTs for each service. The RRA solution must additionally satisfy the SC-FDMA constraints of resource exclusivity and adjacency.

Figure 2:
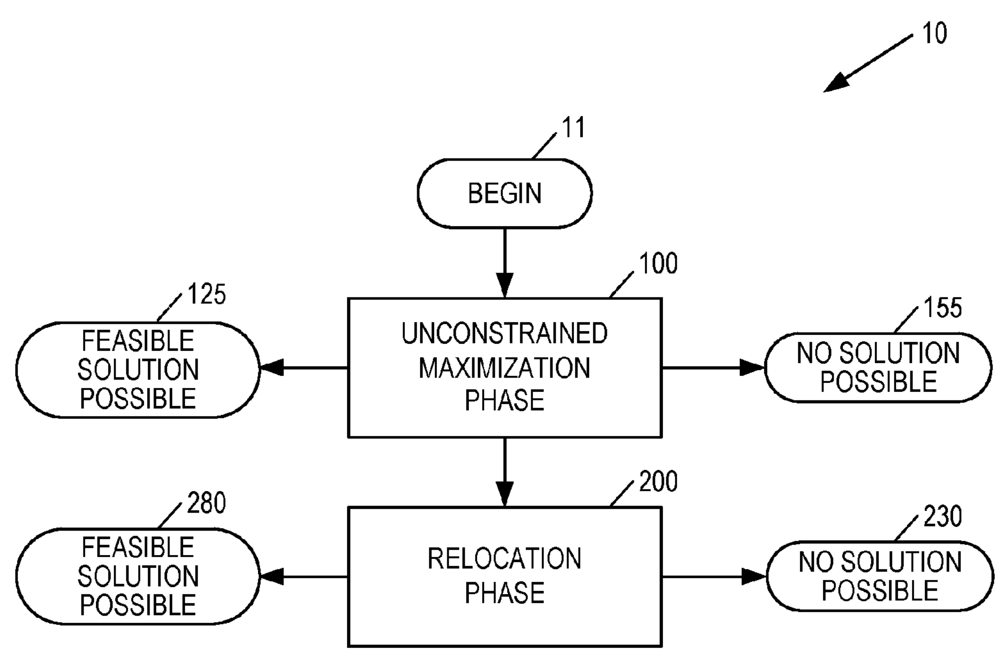
FIG. 2 is a flow diagram of an RRA method according to embodiments of the present invention.

According to embodiments of the present invention, such an RRA solution is found by a two-phase method 10, depicted in FIG. 2. The method 10 begins (block 11) in advance of a predetermined uplink transmission duration, such as a frame, for which the MT resource allocations are desired. The method 10 may end with an RRA allocation that satisfies all applicable constraints (blocks 125, 280), or it may end with the conclusion that no feasible solution exists for a particular combination of MTs, services, and resources (blocks 155, 230). In either case, the method 10 should conclude with sufficient time for the BS to transmit the RRA results to the MTs prior to the beginning of the relevant uplink frame. The method 10 is normally performed anew ahead of each uplink frame.

Initially, in an Unconstrained Maximization phase 100, resources are iteratively allocated to the MTs in an opportunistic way, obeying the adjacency constraint but without concern for QoS considerations. Fulfillment of the minimum service requirement constraint is tested, and MTs are removed from the allocation process if possible. A feasible solution (block 125) satisfying both the SC-FDMA exclusivity and adjacency constraints and the minimum service requirement constraint may be obtained in the Unconstrained Maximization phase 100. Alternatively, it may be discovered in this phase 100 that no solution is possible that satisfies all constraints (block 155). In general, however, the Unconstrained Maximization phase 100 may result in a resource allocation that neither satisfies all constraints (block 125) nor determines that such an allocation is impossible (block 155), and control will flow to a Reallocation phase 200.

In the Reallocation phase 200, frequency resource allocations are altered, shifting resources from data-rate-satisfied MTs to data-rate-unsatisfied MTs. An iterative reallocation process conditionally reallocates resources in different size blocks, testing that the minimum requirements of both donor and receiver MTs are satisfied at each stage. If a satisfactory solution is not found, the resource block size is changed, and another reallocation attempt is made. The Reallocation phase is constrained to preserve the exclusivity and adjacency constraints satisfied in the Unconstrained Maximization phase 100. In most cases, a feasible solution will be found that satisfies both the SC-FDMA exclusivity and adjacency constraints, and the minimum service requirement constraint (block 280). However, in some cases, Reallocation phase 200 will determine that no solution satisfying all applicable constraints is possible (block 230) for a given combination of MTs, services, and available frequency resources.

Figure 3:
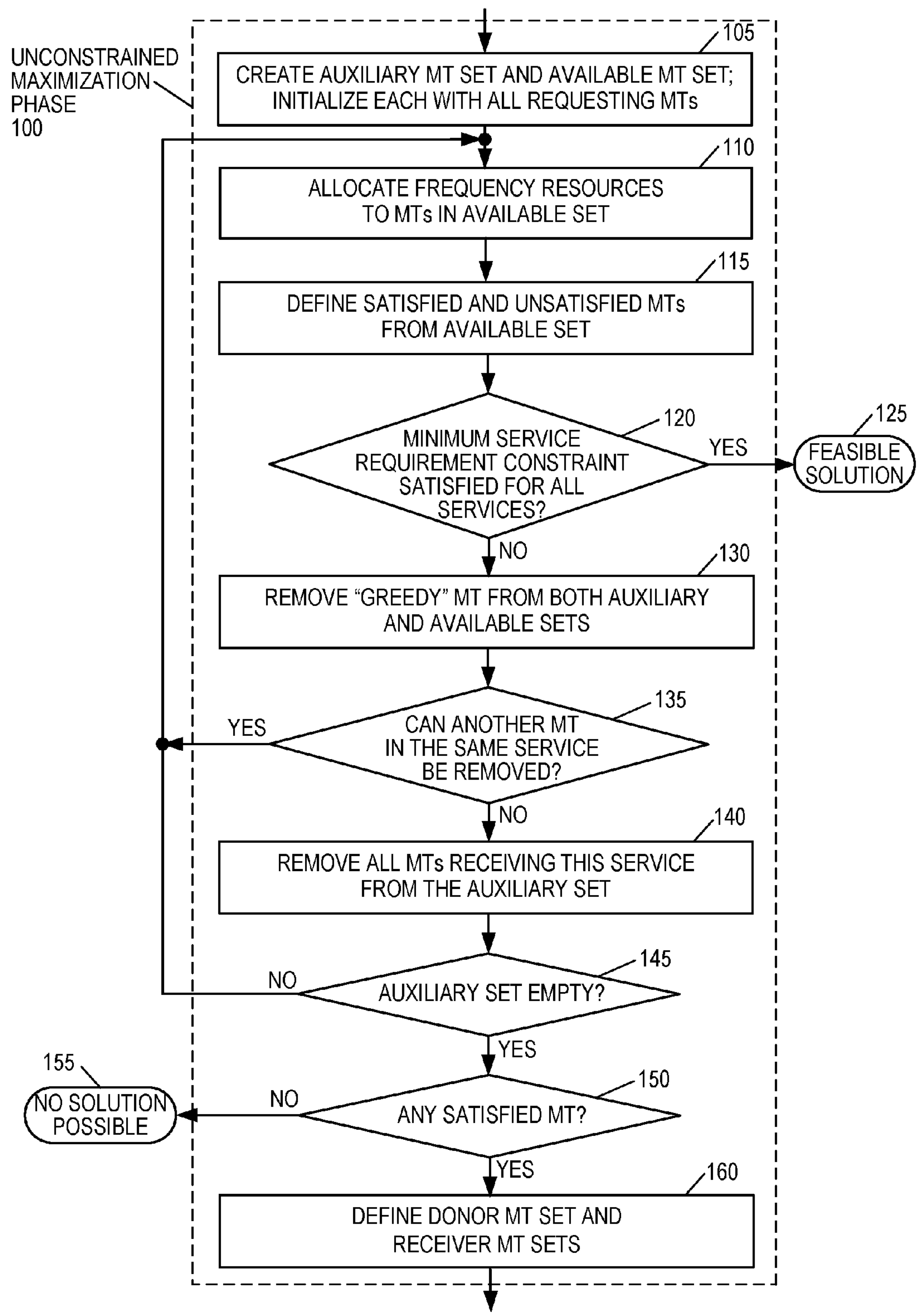
FIG. 3 is a flow diagram of the Unconstrained Maximization phase of the method of FIG. 2.

FIG. 3 depicts the detailed steps that make up the Unconstrained Maximization phase 100. As the method 10 begins, the BS has knowledge of at least one metric that represents the channel quality state of each frequency resource for each MT. This may comprise, for example, estimates of Signal to Interference plus Noise (SINR) for each frequency resource. As known in the art, this information can be obtained by feedback information sent by each MT to the BS, using control channels.

Initially, two sets of MTs are defined and initialized with the set of all MTs requesting uplink transmissions (block 105). The sets are denoted an available ($\mathcal{A}$) MT set and an auxiliary ($\mathcal{B}$) MT set. The auxiliary MT set $\mathcal{B}$ contains the MTs that can be disregarded or removed from the problem without infringing the minimum service requirement constraints. The available MT set $\mathcal{A}$ contains the MTs that were not disregarded, and can be allocated resources in the Reallocation phase 200. The MTs from the available MT set $\mathcal{A}$ are then used to find an efficient RRA solution in terms of spectral efficiency, which also fulfills the adjacency constraint.

Frequency resources are then allocated to the MTs in the available MT set $\mathcal{A}$ in a manner that satisfies the SC-FDMA exclusivity and adjacency constraints (block 110). In one embodiment, this allocation is one that maximizes the sum of all data rates transmitted by all MTs. This allocation may be performed using a method disclosed by the present inventors in a co-pending US Patent Application, titled "Method and Apparatus for Resource Allocation to Maximize the Total Data Rate in SC-FDMA Uplink," filed concurrently herewith and assigned to the assignee of the present application, the disclosure of which is incorporated herein by reference in its entirety. Alternatively, either of two methods disclosed in U.S. Pat. No. 7,911,934, titled "Resource Allocation in Multi Data Stream Communication Link" may be used to perform the allocation. The former method is preferred, as it provides good results at a significantly lower computational complexity than either of the methods in the '934 patent.

With frequency resources initially allocated (block 110) the data rate satisfaction status of each MT in the available MT set $\mathcal{A}$ is determined (block 115). An MT is considered satisfied if it has its required data rate fulfilled; otherwise, it is unsatisfied.

If the required minimum number of satisfied MTs is fulfilled for each service (block 120), then the minimum service requirement constraint has been satisfied, and a feasible solution to the allocation problem has been found (block 125). In this case, the method 10 terminates for this uplink frame.

On the other hand, if the minimum service requirement constraint is not satisfied (block 120), an MT is removed, or disregarded, from both the available MT set $\mathcal{A}$ and the auxiliary MT set $\mathcal{B}$ (block 130). Preferably, a "greedy" MT—that is, an MT having high resource consumption requirements—is selected to be disregarded. In one embodiment, the MT selected for removal is the one having the lowest ratio between the average wideband channel quality and the required data rate—that is, the MT having the poorest channel quality and the highest data rate requirement. In one embodiment, the MT to be disregarded may be selected according to $$j^* = \operatorname{argmin}\left(\frac{\frac{1}{c \cdot N}\sum_{n \in N}\sum_{z=1}^{c}\gamma_{j,z,n}}{t_j}\right) \quad (1)$$

where c is the number of subcarriers in a frequency resource, N is the number of available frequency resources, N is the set of all frequency resources, $y_{j,z,n}$ is the Signal to Noise Ratio (SNR) of MT i on the $z^{th}$ subcarrier of the frequency resource n, and $t_j$ is the required data rate by MT j. This criterion to disregard an MT is quite reasonable: the MT that is chosen to be disregarded is the one that requires, on average, more resources to be satisfied. Note, however, that selection of the greediest MT is not a limitation of the method 10. In some embodiments, an MT imposing a lower demand on system resources may be disregarded, and the method 10 may still iterate to a feasible solution. The selected MT is removed from both the available MT set $\mathcal{A}$ and the auxiliary MT set $\mathcal{B}$ (block 130).

The service in which the disregarded MT is engaged is noted, and it is determined whether another MT engaged in the same service can also be disregarded from the available MT set $\mathcal{A}$, without infringing the minimum service requirement constraint for the service (block 135). When an MT is disregarded, it is considered to be unsatisfied. There should be at least $k_s$ non-disregarded MTs for service s where $k_s$ is the required minimum number of MTs that should be satisfied for service s.

If another MT employing the service of the selected MT $j^x$ can be disregarded (block 135), then control flows to block 110, where allocation of frequency resources is repeated on the available MT set $\mathcal{A}$ (now without the removed $MT^x$), reallocating the frequency resources among the remaining MTs. The satisfied MTs in the smaller available MT set $\mathcal{A}$ are determined (block 115), and if the minimum number of satisfied MTs for each service exist (block 120); a solution has been found (block 125). Otherwise, another MT is disregarded (block 130).

If the service in which the latest disregarded MT is engaged just meets its minimum service requirement constraint—that is, no more MTs engaged in the same service can be disregarded (block 135)—then all of the MTs engaged in that service are removed from the auxiliary MT set $\mathcal{B}$ (block 140). As stated above, the auxiliary MT set $\mathcal{B}$ contains the MTs that can be disregarded without infringing the minimum service requirement constraints. Accordingly, once a service's minimum service requirement constraint is satisfied, all MTs engaged in that service are removed, leaving only MTs that can still (potentially) be disregarded.

After purging a minimally satisfied service's MTs from the auxiliary MT sets $\mathcal{B}$ (block 140), if any MTs remain in the auxiliary MT set $\mathcal{B}$ (block 145), then control again flows to block 110, and frequency resources are again allocated among the remaining MTs in the available MT set $\mathcal{A}$. Otherwise—that is, if the auxiliary MT set $\mathcal{B}$ is empty—then the available MT set $\mathcal{A}$ is checked to ascertain whether any data rate satisfied MT remains (block 150). At least one satisfied MT with an excess of allocated resources must remain in the available MT set $\mathcal{A}$ in order to donate resources to one or more other MTs in the Reallocation phase 200 of the RRA method 10.

If there is no satisfied MT in the available MT set $\mathcal{A}$ after executing the Unconstrained Maximization phase 100 of the RRA method 10, then the method 10 is not able to find a feasible solution that complies with the minimum service requirement constraints (block 155), and the method 10 terminates. Since the RRA problem cannot be solved, the minimum service requirement constraints could be relaxed by disregarding the MTs of the services with lower priority, such as best effort services. Then, the Unconstrained Maximization phase 100 may be executed again, in an attempt to find at least one satisfied MT.

Finally, with at least one satisfied MT in the available MT set $\mathcal{A}$, two new sets are defined from MTs remaining in the available MT set $\mathcal{A}$: a donor MT set $\mathcal{D}$ and a receiver MT set $\mathcal{R}$. The donor MT set $\mathcal{D}$ comprises the data rate satisfied MTs in the available MT set $\mathcal{A}$ that can donate resources to unsatisfied MTs. The receiver MT set $\mathcal{R}$ comprises the unsatisfied MTs from the available MT set $\mathcal{A}$ which must receive resources from the donor MTs to satisfy their rate requirements.

Figure 4A:
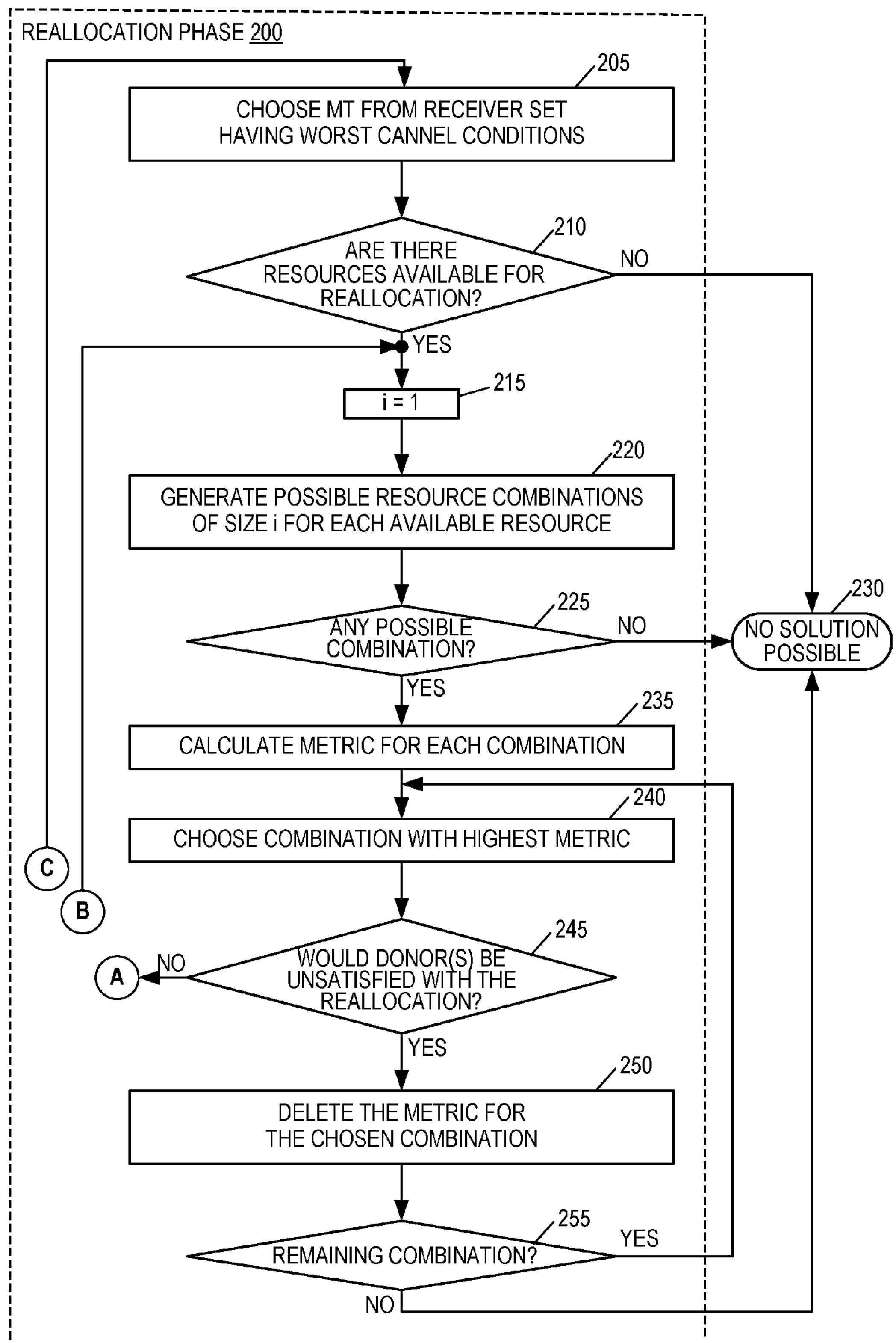
FIGS. 4A and 4B are flow diagrams of the Reallocation phase of the method of FIG. 2.
Figure 4B:
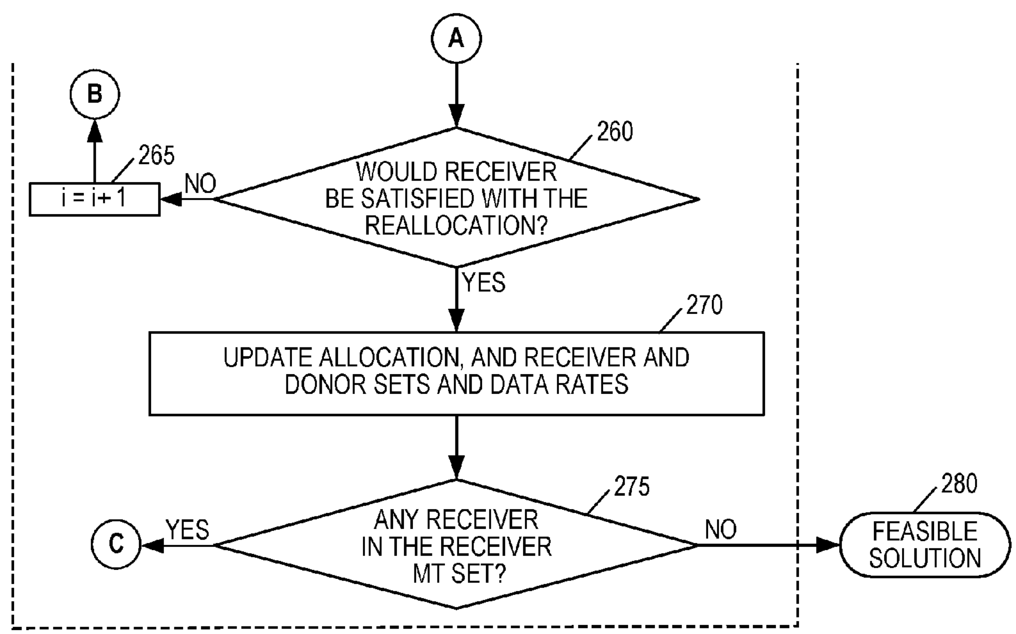

FIG. 4 depicts the Reallocation phase 200 of an RRA method 10 according to embodiments of the present invention. In this phase, resources are reallocated from satisfied to unsatisfied MTs.

First, the MT from the receiver MT set $\mathcal{R}$ with the worst average wideband channel quality is chosen to receive resources and be satisfied (block 205). All available resources that can be donated to the selected receiver MT are identified (block 210). This identification is made considering the adjacency constraint. If there is no available resource to be donated to the selected MT, then no solution can be found by the RRA method 10 (block 230).

The primary motivation for choosing the MT in worst channel condition to receive resources first is to allocate the minimum number of resources to satisfy it. In this case, more resources will remain with the MTs that can more efficiently use them—that is, the MTs that experience better channel quality. In order to identify the available resources of the selected MT, two cases regarding the RRA performed in the Unconstrained Maximization phase 100 are considered.

First, consider the case that the selected receiver MT was allocated at least one frequency resource in the Unconstrained Maximization phase 100 of the RRA method 10. Assume that the selected MT was assigned the block of adjacent frequency resources from n' to n" with n'≤n" and n'≠1 and n"≠N. In this case, the resources that are available for reallocation are n'−1 and n"+1—i.e., the adjacent resources to the left or right of the allocated block. Note that if n'=1 or resource n'−1 belongs to another receiver MT, then the resource n'−1 is not available for reallocation. Similarly, if n"=N or resource n"+1 belongs to another receiver MT, the resource n"+1 is not available for reallocation. In this case, since the receiver MT was assigned a resource or a block of resources and so as not to break the adjacency constraint, the available resources are the ones adjacent to the resources already assigned to the receiver MT.

Second, consider the case that the selected receiver MT was not allocated any resource in the Unconstrained Maximization phase 100 of the RRA method 10. In this case, the available resources for reallocation are the first and the last resources of the blocks assigned to each donor MT in the Unconstrained Maximization phase 100. In this case, the choice of the available resources is defined so as not to break the adjacency constraint on the resources already assigned to the donor MTs. Therefore, the available resources are the ones at the edges of the block allocated to each donor MT.

Figure 5:
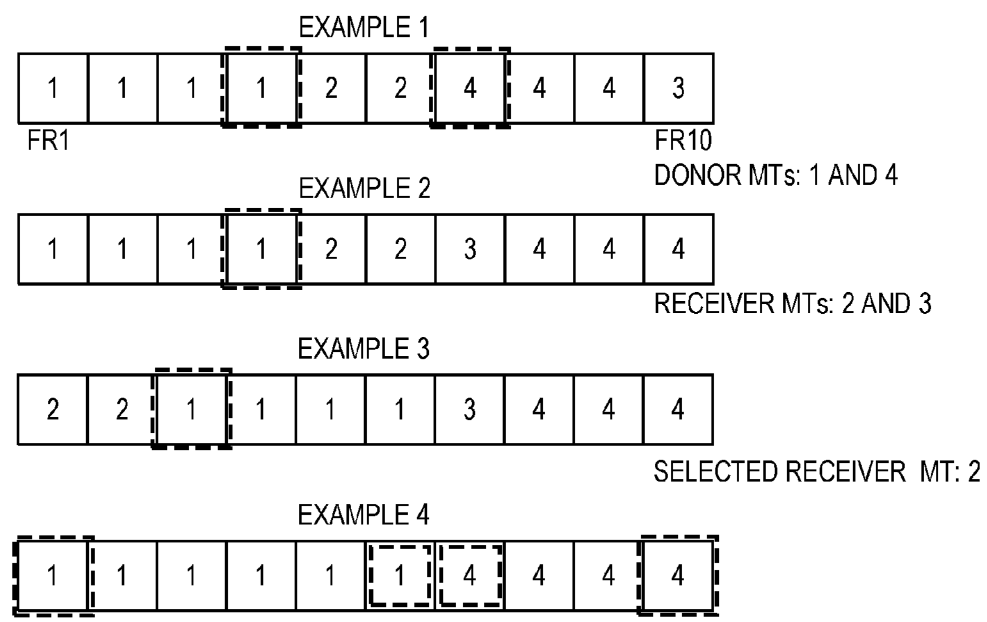
FIG. 5 is a resource diagram depicting single frequency resource reallocation.

FIG. 5 illustrates four hypothetical allocations of ten adjacent frequency resources (FR1-FR10) after the Unconstrained Maximization phase 100 of the RRA method 10. In all four examples, MT1 and MT4 have their minimum data rates satisfied, and are hence donor MTs. MT2 and MT3 are receiver MTs, which are unsatisfied and must have resources reallocated to them in order to satisfy their minimum data rate requirements. In the examples of FIG. 5, MT2 had the worst average wideband channel quality, and was chosen from the receiver MT set in block 205 to receive frequency resources from the donor MTs MT1 and MT4.

In example 1 of FIG. 5, the frequency resources available for reallocation to MT2 are FR4 (receiving a frequency resource from donor MT1) and FR7 (receiving a frequency resource from donor MT4). This is an application of the first case described above, wherein MT2 was allocated a block of at least one frequency resources, and those available for reallocation lie to the immediate (adjacent) left and right of the previously allocated block. In particular, in example 1, MT2 is allocated both n'−1 and n"+1.

In example 2, frequency resource FR7 cannot be allocated to MT2 because it is not allocated to a donor MT; rather, it is allocated to receiver MT3. In this case, only frequency resource FR4 can be reallocated to MT2 from donor MT1—that is, n'−1, or the frequency resource to the left of the block allocated to MT2 in the Unconstrained Maximization phase 100.

In example 3, the block allocated to MT2 comprises the left-most block—that is, n'=1. Accordingly, no frequency resources exist to the left to be allocated to MT2. Only one frequency resource adjacent the block allocated to MT2 was allocated to a donor MT: FR3, allocated to MT1.

Example 4 illustrates the second case described above, i.e., that MT 2 was not allocated any resources in the Unconstrained Maximization phase 100. In this case, to preserve the adjacency constraint on both donor MT1 and MT4, the outermost frequency resources in each block are available for reallocation to MT2. In particular, frequency resources FR1 or FR6 may be reallocated from donor MT1 to receiver MT2, and frequency resources FR7 or FR10 may be reallocated from donor MT4 to receiver MT2. Each such allocation is in the alternative ("or")—the frequency resources at the outermost edge of a donor MT cannot both be reallocated, as the resulting allocation to the receiver MT would violate the adjacency constraint. Note, however, that both FR6 and FR7 may be reallocated to MT2 (from MT1 and MT4, respectively), providing greater resources to MT2 while satisfying the adjacency constraint.

Referring back to FIG. 4, if frequency resources available for reallocation are identified (block 210), then a variable i is initiated to 1 (block 215). The variable i represents the reallocation block size. All possible contiguous frequency resource groups of size i are then generated (block 220), based on each frequency resource available for reallocation that was identified in block 210. The contiguous frequency resource groups of size i are generated for each available frequency resource based on two premises: first, the frequency resource group should include the available frequency resource; and second, the frequency resource group should not include any frequency resource allocated to any receiver MT other than one selected at block 205 of FIG. 4.

Figure 6:
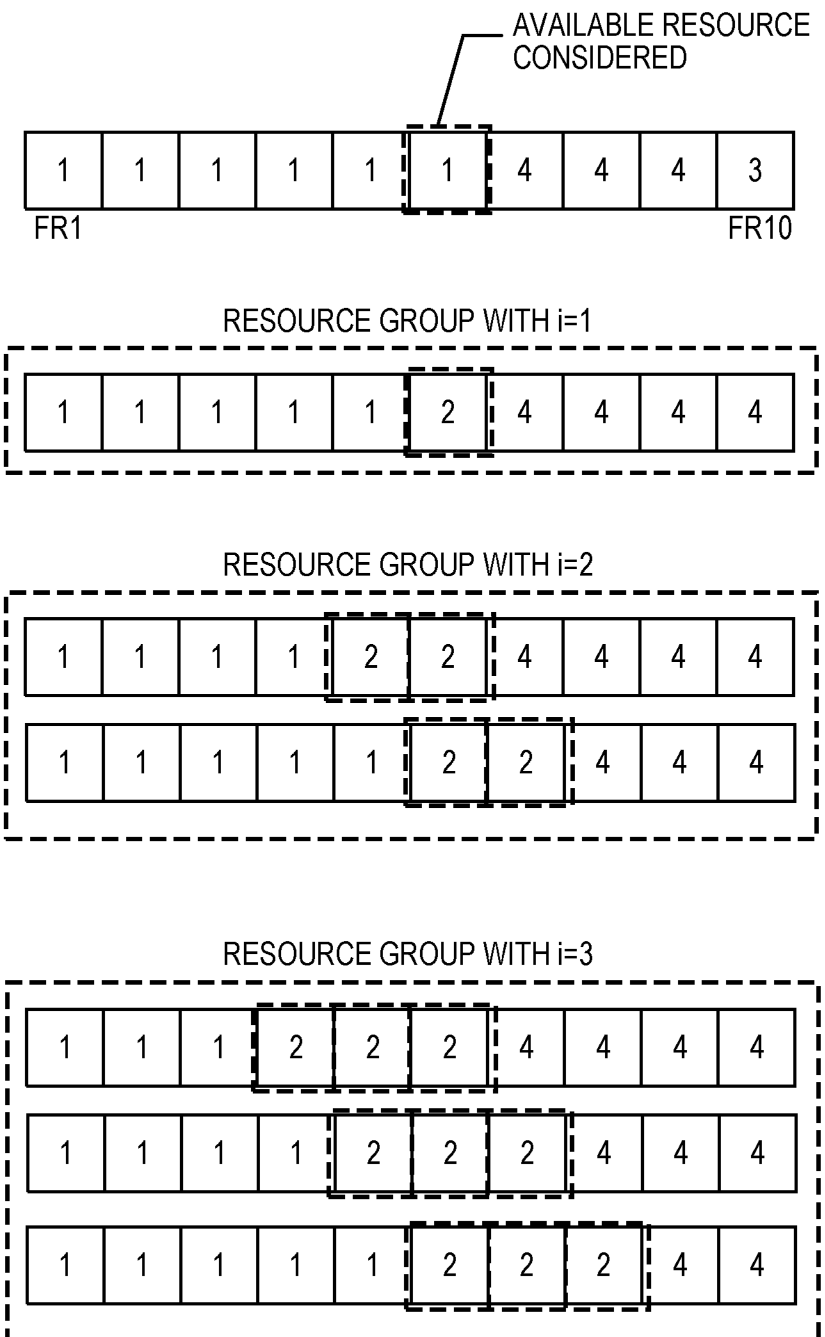
FIG. 6 is one resource diagram depicting block frequency resource reallocation for different block sizes.
Figure 7:
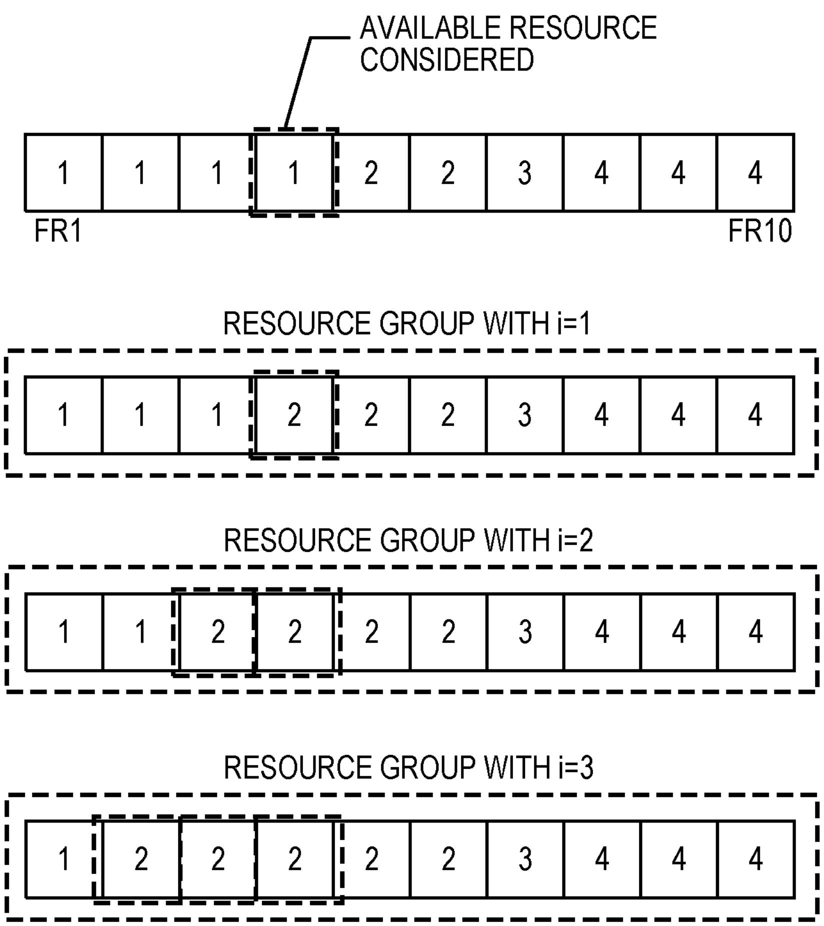
FIG. 7 is another resource diagram depicting block frequency resource reallocation for different block sizes.

This process is demonstrated, with different block sizes i, in FIGS. 6 and 7. FIG. 6 demonstrates the process applied to the frequency resource allocation depicted in example 4 of FIG. 5. In this case, the right-most frequency resource of the block allocated to donor MT1, or FR6, is the available resource considered. When i=1, only frequency resource FR6 is allocated to receiver MT2.

When i=2, two allocations are possible. In one allocation, frequency resources FR5 and FR6 may be reallocated from donor MT1 to receiver MT2. Alternatively, one frequency resource FR6 may be reallocated from donor MT1 to receiver MT2, along with one frequency resource FR7 reallocated to receiver MT2 from donor MT4. This is possible because both MT1 and MT4 are donor MTs.

When i=3, three allocations are possible. First, receiver MT2 may be reallocated three frequency resources FR4-FR6 from donor MT1. Second, MT2 may receive two frequency resources F5-FR6 from donor MT1 and one frequency resource FR7 from donor MT4. Finally, MT2 may receive one frequency resource FR6 from donor MT1 and two frequency resources FR7-FR8 from donor MT4.

FIG. 7 demonstrates the possible resource groups that can be generated based on the available frequency resource FR4, in the allocation presented in the example 2 of FIG. 5, for three different values of the block size i. In this case, to satisfy the adjacency constraint, only consecutively more frequency resources may be allocated from donor MT1 as the block size i increases. In particular, with i=1, one frequency resource FR4 may be reallocated from donor MT1 to receiver MT2. When i=2, two frequency resources FR3-FR4 may be reallocated from donor MT1 to receiver MT2. Finally, when i=3, three frequency resources FR2-FR4 may be reallocated from donor MT1 to receiver MT2.

If there is no possible frequency resource group for each available frequency resource (block 225), then the RRA method 10 is not able to find a feasible solution (block 230) for the combination of MT data rate requirements, channel conditions, minimum service requirement constraints for each service, and the like.

If at least one frequency resource combination was found through reallocation (block 225), an efficiency metric is calculated for each frequency resource combination (block 235). In one embodiment, the efficiency metric of a given frequency resource group is chosen so as to represent the benefit to the total system efficiency of allocating the frequency resource group to the selected receiver MT. In one embodiment, the metric is the following when Minimum Mean Square Error (MMSE) frequency domain equalizer is considered:

$$\varphi_{\pi} = \left( \frac{1}{\frac{1}{c \cdot (n'' - n' + 1)} \sum_{n=n'}^{n''} \sum_{z=1}^{s} \frac{\gamma_{j',z,n}}{\gamma_{j',z,n} + 1}} - 1 \right)^{-1} \quad (2)$$

where $\varphi_a$ is the efficiency metric of the $a^{th}$ frequency resource group, n' and n" are the first and last resources of the $a^{th}$ contiguous frequency resource group, and i' is the index of the receiver MT selected at block 205. The frequency resource combination with highest efficiency metric is then chosen (block 240).

Once the most efficient frequency resource reallocation from one or more donor MTs to the selected receiver MT is chosen (block 240), the data rate satisfaction of both the donor MT(s) and receiver MT are verified.

First, it is determined whether the allocation of the frequency resource group to the selected receiver MT would leave any donor MT unsatisfied, i.e., any donor MT would have a transmit data rate lower than the required one (block 245). If so, the selected metric of the frequency resource combination is deleted (block 250), and if another resource group exists (block 255), the remaining one with the highest metric is chosen (block 240). This loop iterates until a frequency resource combination is found (having the highest efficiency metric of those remaining) that does not violate any donor MT's data rate satisfaction. If the loop iterates through all of the frequency resource combinations and none of them leave all donor MTs satisfied (block 255), then no solution to the RRA problem is possible (block 230).

Once it is verified that the donor MT(s) can supply the reallocated frequency resources without violating their minimum data rate requirements (block 245), the Reallocation phase 200 of the RRA method 10 verifies that the reallocated frequency resources satisfy the selected receiver MT's minimum data rate requirement (block 260). If not, then the receiver MT requires an allocation of more frequency resources, and the block size i is incremented by one (block 265). Control then flows back to block 220, where frequency resource combinations are again generated by reallocating available frequency resources from one or more donor MTs to the selected receiver MT, this time with the receiver MT being reallocated the larger block size of frequency resources. The purpose of increasing the block size i is to increase the possibility of satisfying the selected receiver MT, since the potential data rate of the selected receiver MT is also increased with larger resource groups. The best combination is selected (block 240) and the donor MT(s) are checked for minimum data rate satisfaction (block 245). After any necessary iterations through the new combinations, once a frequency resource combination is found that satisfies the donor MT(s) (block 245), the method 10 verifies that the combination satisfies the receiver MT's minimum data rate.

When a reallocation of frequency resources is found that satisfies the minimum data rates of all donor MTs and the selected receiver MT (block 260),) the resource allocation, the donor MT set $\mathcal{D}$, the receiver MT set $\mathcal{R}$, and the data rates are updated (block 270). If any MT remains in the receiver MT set $\mathcal{R}$, then control flows to block 205, where another receiver MT is chosen, to whom frequency resources will be reallocated to satisfy its minimum data rate requirement, and the process repeats with the new selected receiver MT.

When all receiver MTs from the receiver MT set $\mathcal{R}$ have been satisfied, then a feasible RRA solution has been found, which meets both the SC-FDMA constraints of exclusivity and adjacency, and the minimum service requirement for each service in which the uplink-requesting MTs are engaged.

If the RRA method 10 is not able to find a feasible allocation, one option is to disregard a MT according to equation (1), and repeat the Unconstrained Maximization phase 100 and Reallocation phase 200 of the RRA method 10. Note, however, that this option does not comply with the original minimum service requirement constraints.

The performance of the RRA method 10 of the present invention was evaluated in computational simulations. The uplink resource assignment was evaluated in a sector of a tri-sectorized cellular system. The results were obtained by performing several independent snapshots in order to get valid results in a statistical sense. In each snapshot, the MTs were uniformly distributed within a hexagonal sector whose BS is placed on a corner. An SC-FDMA system was assumed, with uplink resources arranged in a time-frequency grid. The resources comprise a group of 12 adjacent subcarriers in the frequency dimension by 1 ms long in the time dimension. The propagation model includes a distance-dependent path loss model, a log-normal shadowing component and a Rayleigh-distributed fast fading component. Specifically, the fast-fading component of the channel gain of a given MT is considered independent among resources. This hypothesis is reasonable since in general the resources are designed to have a frequency bandwidth on the order of the coherence bandwidth of the channel. We assume that link adaptation is performed based on the upper bound Shannon capacity. The transmit power per resource was chosen as 0.1 W. The main simulation parameters are summarized in Table 1, and the simulated scenarios are presented in Table 2.

TABLE 1

Simulation Parameters

| Parameter | Value | Unit |
|---|---|---|
| Cell radius | 334 | m |
| Transmit power per resource | 0.1 | W |
| Number of subcarriers per resource | 12 | — |
| Number of resources | 25 | — |
| Shadowing standard deviation | 8 | dB |
| Path loss[2] | $35.3 + 37.6 \cdot \log_{10}{}^{d}$ | dB |
| Noise spectral density | $3.16 \cdot 10^{-20}$ | W/Hz |
| Number of snapshots | 3000 | — |
| BER for capacity gap (BER) | $10^{-4}$ | — |
| Number of services | 3 | — |
| Number of flows | See the description of the scenarios | — |
| Required minimum number of satisfied flows | See the description of the scenarios | — |
| Required data rate of the flows | From 10 kbps to 100 kbps | — |

TABLE 2

Simulation Parameters

| Scenario | S | $J_1$ | $J_2$ | $J_3$ | $k_1$ | $k_2$ | $k_3$ |
|---|---|---|---|---|---|---|---|
| 1 | 3 | 3 | 3 | 3 | 3 | 2 | 2 |
| 2 | 3 | 3 | 3 | 3 | 3 | 3 | 2 |
| 3 | 3 | 3 | 3 | 3 | 3 | 3 | 3 |

To enable qualitative comparisons, in addition to the RRA method 10 of the present invention, the optimal solution of the resource allocation problem, identified as "SatisOpt," was simulated and evaluated. Additionally, the optimal solution of the problem of maximizing the total data rate without minimum service requirement constraints, identified as "MaxRateOpt," was simulated and evaluated. The "MaxRateOpt" solution corresponds to the second proposed method in U.S. Pat. No. 7,911,934, "Resource Allocation in Multi Data Stream Communication Link." The channel realizations were the same for all simulated algorithms in order to obtain fair comparisons. The choices of the number of MTs and resources were limited by the computational complexity to obtain the optimal solution. Two main performance metrics are considered: outage ratio and total data rate. An outage event occurs when an algorithm cannot manage to find a feasible solution, i.e., the algorithm does not find a solution fulfilling the constraints of the problem (minimum service requirement constraints). The outage ratio is defined as the ratio between the number of snapshots with outage events and the total number of simulated snapshots. The total data rate is the sum of the data rates obtained by all the MTs in the cell in a given snapshot.

Figure 8:
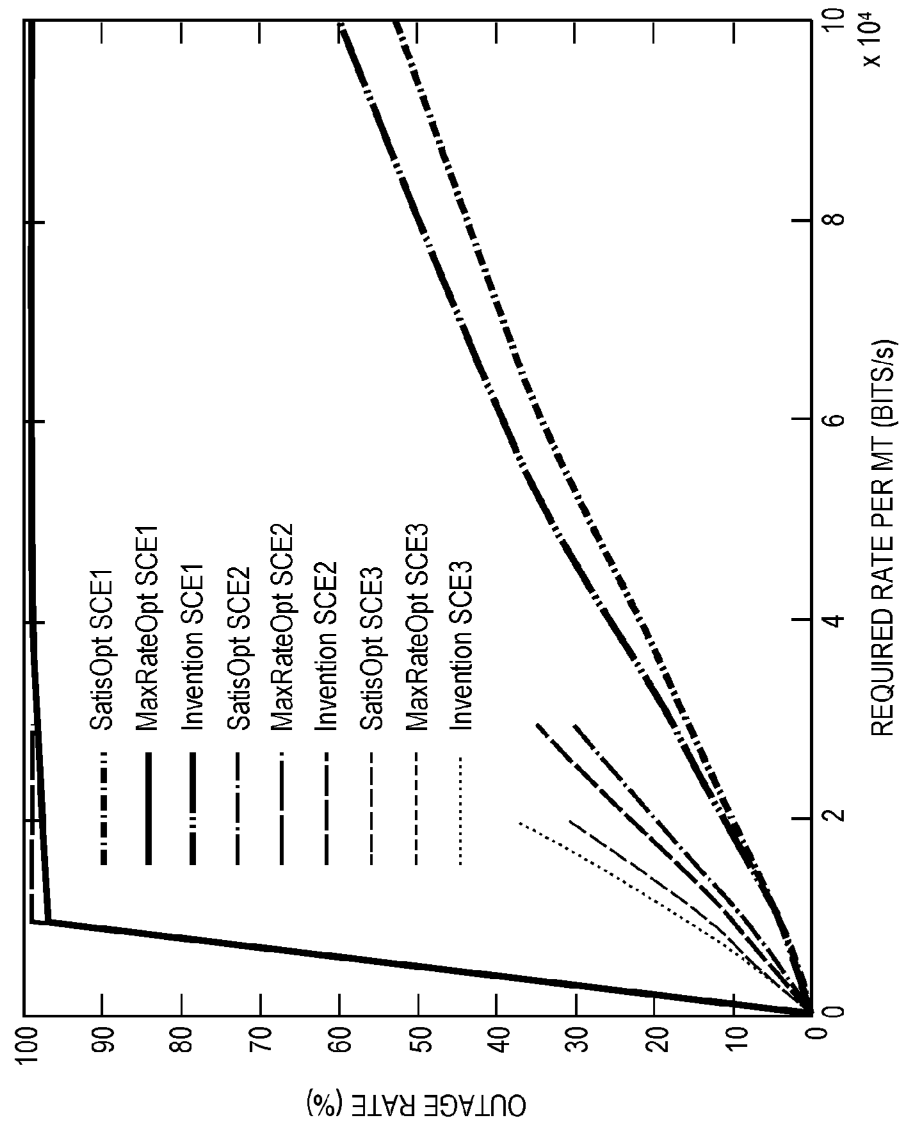
FIG. 8 is a performance evaluation graph depicting of the outage rate of various allocation algorithms.

In the graphs depicting the evaluations, the $i^{th}$ scenario is denoted as SCEi. FIG. 8 presents the outage ratio versus the data rate required by all MTs in scenarios 1, 2, and 3 for the algorithms SatisOpt, MaxRateOpt and the RRA method 10 of the present invention.

First, it is apparent that the outage rate increases with the data rate requirement of the MTs for all algorithms, as expected. Moreover, it is apparent that the outage rate for the same algorithm increases from scenarios 1 to 3. The reason for this is the variation of the minimum number of MTs that should be satisfied. The total number of MTs that should be satisfied in scenario 1 is seven, whereas in scenario 3 it is nine. Another general observation is that the MaxRateOpt solution presents high outage rates even for low data rate requirements. The reason for this is that it maximizes the total data rate without any Quality of Service (QoS) guarantee. Consequently, only few MTs (with best channel conditions) get most of the system resources and become satisfied.

Another observation that can be made about FIG. 8 concerns the relative performance of the inventive RRA method 10 and SatisOpt solution. It is apparent that the inventive method is able to maintain a relatively small outage rate difference with respect to the SatisOpt solution in low and medium loads. Focusing on the required data rate where the corresponding CRM OPT solution has an outage rate of 10%, it is apparent that the differences in outage rate between the inventive RRA method and the SatisOpt solution in FIG. 7 are not higher than 2% in scenarios 1, 2 and 3.

Figure 9:
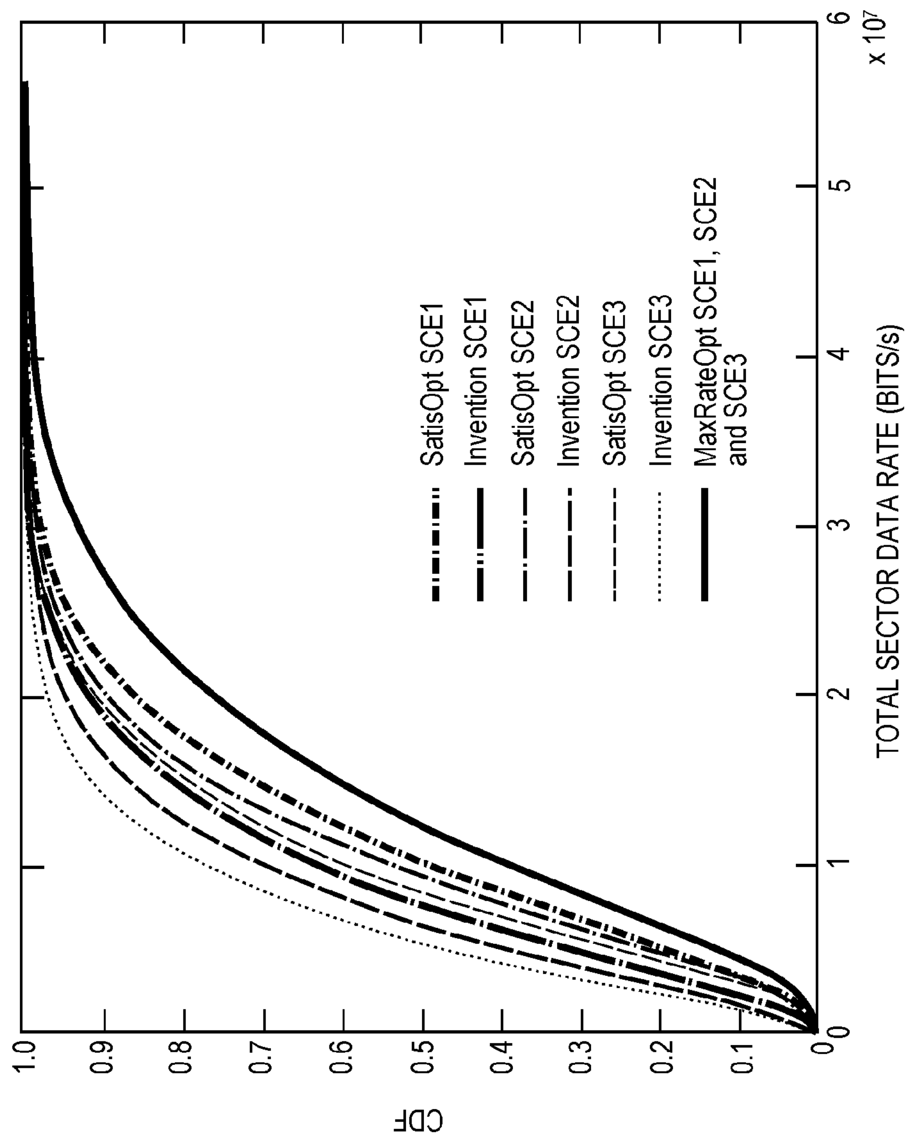
FIG. 9 is a performance evaluation graph depicting the Cumulative Distribution Function of various allocation algorithms as a function of data rate.

The outage rate performance metric shows the capability of the algorithms in finding a feasible solution to the problem. On the other hand, FIG. 9 depicts the Cumulative Distribution Function (CDF) of the total data rate for specific data rate requirements considered in the x-axis of FIG. 8 regarding the outage rate performance. For a specific scenario and load, the CDFs of all algorithms are built with the samples of the snapshots in which the inventive RRA method 10 and the SatisOpt solutions were able to find a solution (no outage). Therefore, possibly many of the samples used in the CDFs for MaxRateOpt are in outage. The main purpose for including results of MaxRateOpt solution is to show how the QoS and minimum service requirement constraints of the problem impose losses in the total achievable data rate.

FIG. 9 presents the CDFs of the total data rate for SatisOpt, MaxRateOpt and the inventive RRA method 10 for scenarios 1, 2, and 3 for the required data rate of 20 kbps. First, it is apparent that the MaxRateOpt solution provides highest total data rates. This is a general observation that comes at the cost of higher outage rate as shown in FIG. 8, i.e., the MaxRateOpt solution is a QoS-unaware algorithm.

Focusing on the performance of the RRA method 10 of the present invention, some observations may be made. The practical loads here are the ones in which the SatisOpt solution presents outage rates lower than 10%. In other words, this means that in general the problem to be solved is feasible 90% of the time. In general, as seen through the analysis of other simulation results (not shown), it can be observed that the performance loss of the inventive RRA method 10 relative to SatisOpt (optimal solution) increases with the load. As one example, when the MTs require a data rate of 20 kbps, the performance losses of the inventive RRA method 10 relative to the SatisOpt solution at the $50^{th}$ percentile of the total data rate are of 23%, 30%, and 37% in scenarios 1, 2, and 3, respectively. It is important to mention here that the increased performance losses at high loads are not critical, since these loads are not of interest for practical purposes due to the high outage rates.

In a consideration of algorithms, computational complexity analysis is important. The SatisOpt solution has an exponential worst-case computational complexity of:

$$o(\sqrt{2}^{JN^2}) \quad (3)$$

where S is the total number of MTs and N is the number of frequency resources available for allocation. This computational complexity analysis assumes that the solution is obtained by means of Integer Linear Program (ILP) solvers such as Branch and Bound (BB) method. It is clear that the computational complexity of this method makes the practical use of this algorithm infeasible.

In contrast, the worst-case computational complexity of the RRA method 10 disclosed herein is given by:

$$o((\Sigma_{s\in S}k_s)(N-\Sigma_{s\in S}k_s)^3) \quad (4)$$

where S is the set of all provided services. This is a polynomial worst-case computational complexity, as opposed to the exponential worst-case computational complexity of the SatisOpt solution.

In consideration of the outage rates and total data rates, it is apparent that the RRA method 10 of the present invention achieves a good performance-complexity trade-off compared to the SatisOpt solution.

In general, the RRA method 10 of the present invention is performed in a network node responsible for scheduling and allocating resources to requesting MTs. This node may, for example comprise the eNodeB in LTE networks, or the Radio Network Controller (RNC) in UTMS networks. Those of skill in the art will readily recognize the optimal network node for implementing the RRA method 10 of the present invention, for any given network configuration.

Figure 10:
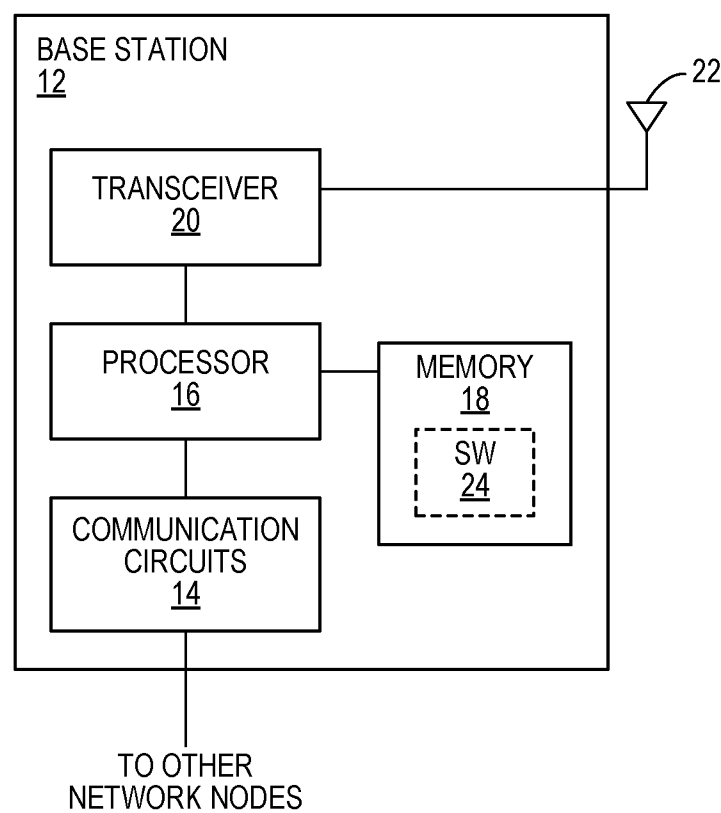
FIG. 10 is a functional block diagram of a base station employing the RRA method of FIG. 2.

FIG. 10 depicts a base station 12 as representative of a network node operative to perform the RRA method 10. As those of skill in the art are aware, a base station 12 is a network node providing wireless communication services to one or more MTs in a geographic region known as a cell or sector. A base station 12 includes communication circuitry 14 operative to exchange data with other network nodes; a controller 16; memory 18; and radio circuitry, such as a transceiver 20, one or more antennas 22, and the like, to effect wireless communication across an air interface to one or more MTs. According to embodiments of the present invention, the memory 18 is operative to store, and the controller 16 operative to execute, software 24 which when executed is operative to cause the base station 12 to perform the RRA method 10 as described herein.

The controller 16 may comprise any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. The memory 18 may comprise any non-transient machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. The radio circuitry may comprise one or more transceivers 20 used to communicate with MTs via a Radio Access Network according to one or more communication protocols known in the art or that may be developed, such as IEEE 802.xx, CDMA, WCDMA, GSM, LTE, UTRAN, WiMax, or the like. The transceiver 20 implements transmitter and receiver functionality appropriate to the Radio Access Network links (e.g., frequency allocations and the like). The transmitter and receiver functions may share circuit components and/or software, or alternatively may be implemented separately. The communication circuitry 14 may comprise a receiver and transmitter interface used to communicate with one or more other nodes over a communication network according to one or more communication protocols known in the art or that may be developed, such as Ethernet, TCP/IP, SONET, ATM, or the like. The communication circuitry 14 implements receiver and transmitter functionality appropriate to the communication network links (e.g., optical, electrical, and the like). The transmitter and receiver functions may share circuit components and/or software, or alternatively may be implemented separately.

The RAA method 10 of the present invention provides a feasible solution to an important problem in many current mobile communication networks: resource allocation to improve the efficiency in the use of the system resources while satisfying the minimum service requirement constraints considering multiple services and resource adjacency constraint present in uplink SC-FDMA systems. The disclosed method provides a good complexity/performance trade-off to the solution this problem.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A two-phase Radio Resource Allocation method, by a base station of a wireless communication network, of allocating a first plurality of frequency resources among a second plurality of requesting mobile terminals, wherein each mobile terminal employs a service such that two or more services are represented in the second plurality, a frequency resource allocation satisfying all of an exclusivity constraint that each frequency resource is allocated to only one mobile terminal, an adjacency constraint that all frequency resources allocated to any given mobile terminal are contiguous in a frequency domain, and a minimum service requirement constraint that a predetermined number of the mobile terminals employing each service be granted a required data rate, the method comprising:

executing an Unconstrained Maximization phase of the method comprising:

iteratively allocating frequency resources to the mobile terminals, obeying the exclusivity and adjacency constraints but without regard to the minimum service requirement constraint;

testing a resulting allocation, from the iteratively allocating, for fulfillment of the minimum service requirement constraint; and removing one or more mobile terminals from the allocation based on the minimum service requirement constraint test; and after the Unconstrained Maximization phase, executing a Reallocation phase of the method comprising:

reallocating frequency resources from one or more mobile terminals that has its required data rate fulfilled to one or more mobile terminals that does not have its required data rate fulfilled.

2. The method of claim 1, wherein, in the Unconstrained Maximization phase of the method, the iteratively allocating frequency resources to the mobile terminals comprises:

generating an auxiliary mobile terminal set and an available mobile terminal set, and initializing each set with all requesting mobile terminals;

allocating frequency resources to the mobile terminals in conformance with the adjacency constraint; and defining both a satisfied mobile terminal set and an unsatisfied mobile terminal set, the an satisfied mobile terminal set comprising all mobile terminals in the available mobile terminal set allocated sufficient frequency resources to satisfy their minimum data rate constraints, the unsatisfied mobile terminal set comprising all mobile terminals in the available mobile terminal set allocated insufficient frequency resources to satisfy their minimum data rate constraints.

3. The method of claim 2, wherein, in the Unconstrained Maximization phase of the method, the removing one or more mobile terminals from the allocation based on the minimum service requirement constraint test comprises:

if, after allocating frequency resources, the minimum service requirement constraint is not satisfied for any service engaged in by any mobile terminal in the active mobile terminal set, removing from both the auxiliary and the available mobile terminal sets a mobile terminal requesting substantial resources.

4. The method of claim 3, wherein, in the Unconstrained Maximization phase of the method, the mobile terminal selected for removal is the mobile terminal having the lowest ratio between the average wideband channel quality and the required data rate.

5. The method of claim 4, further comprising, in the Unconstrained Maximization phase of the method:

if another mobile terminal engaged in the same first service as the removed mobile terminal can also be removed without violating the minimum service requirement constraint for the first service, repeating the Unconstrained Maximization phase of the method using the reduced available and auxiliary mobile terminal sets; and otherwise, removing all mobile terminals engaged in the first service from the auxiliary mobile terminal set and, if the auxiliary mobile terminal set is not empty, repeating the Unconstrained Maximization phase of the method using the reduced available mobile terminal set and further reduced auxiliary mobile terminal set.

6. The method of claim 5, further comprising, in the Unconstrained Maximization phase of the method, if any mobile terminals remain in the available mobile terminal set that have their minimum data rate requirement satisfied:

defining a donor mobile terminal set comprising all mobile terminals in the available mobile terminal set that have been allocated excess frequency resources over that required to satisfy their minimum data rate; and defining a receiver mobile terminal set comprising all mobile terminals in the available mobile terminal set that do not have their minimum data rate requirement satisfied.

7. The method of claim 6, wherein, in the Reallocation phase of the method, the reallocating frequency resources from one or more mobile terminals to one or more others comprises iteratively:

generating frequency resource reallocation combinations for a given frequency resource block size;

testing the frequency resource reallocation combinations for satisfaction of minimum data rate requirements for mobile terminals in the donor and receiver mobile terminal sets; and iteratively repeating the Reallocation phase with different bock sizes in response to the testing.

8. The method of claim 7, wherein, in the Reallocation phase of the method, the generating frequency resource reallocation combinations comprises:

selecting a mobile terminal having the worst channel conditions from the receiver mobile terminal set; and if frequency resources are available for reallocation:

generating one or more frequency resource reallocation combinations for a given block size; and calculating an efficiency metric for each frequency resource reallocation combination generated; and choosing the frequency resource reallocation combination having the highest metric.

9. The method of claim 8, wherein, in the Reallocation phase of the method, the testing the frequency resource reallocation combinations comprises:

if the chosen frequency resource reallocation combination would result in the minimum data rate requirement of any mobile terminal in the donor mobile terminal set being unsatisfied:

discarding the chosen frequency resource reallocation combination; and selecting the frequency resource reallocation combination having the next highest metric; and if the chosen frequency resource reallocation combination results in the minimum data rate requirement of all mobile terminals in the donor mobile terminal set being satisfied:

if the chosen frequency resource reallocation combination fails to satisfy the minimum data rate requirement of the selected mobile terminal from the receiver mobile terminal set;

increasing the frequency resource block size; and generating frequency resource reallocation combinations for the new frequency resource block size; and if the chosen frequency resource reallocation combination satisfies the minimum data rate requirement of the selected mobile terminal from the receiver mobile terminal set:

updating the frequency resource allocation and donor and receiver mobile terminal data sets.

10. The method of claim 9, further comprising, in the Reallocation phase of the method, if any mobile terminal remains in the receiver mobile terminal set, repeating the Reallocation phase of the method until the receiver mobile terminal set is depleted or no solution is possible.

11. A base station operative in a wireless communication network, the base station operative to allocate a first plurality of frequency resources among a second plurality of requesting mobile terminals, wherein each mobile terminal employs a service such that one or more services are represented in the second plurality, the frequency resource allocation satisfying all of an exclusivity constraint that each frequency resource is allocated to only one mobile terminal, an adjacency constraint that all frequency resources allocated to any given mobile terminal are contiguous in the frequency domain, and a minimum service requirement constraint that a predetermined number of the mobile terminals employing each service be granted a required data rate, the base station comprising:

a transceiver operative to exchange signaling messages with each requesting mobile terminal;

memory; and one or more processing circuits operatively coupled to the transceiver and memory and configured to function as a controller operative to:

in an Unconstrained Maximization phase of a Radio Resource Allocation method:

iteratively allocate frequency resources to the mobile terminals, obeying the exclusivity and adjacency constraints but without regard to the minimum service requirement constraint;

test the resulting allocation for fulfillment of the minimum service requirement constraint; and remove one or more mobile terminals from the allocation based on the minimum service requirement constraint test; and in a Reallocation phase of the method following the Unconstrained Maximization phase:

reallocate frequency resources from one or more mobile terminals that have their required data rate fulfilled to one or more mobile terminals that do not have their required data rate fulfilled.

12. The base station of claim 11, wherein, in the Unconstrained Maximization phase of the method, the controller is operative to iteratively allocate frequency resources to the mobile terminals by:

generating an auxiliary mobile terminal set and an available mobile terminal set, and initializing each set with all requesting mobile terminals;

allocating frequency resources to the mobile terminals in conformance with the adjacency constraint; and defining both a satisfied mobile terminal set and an unsatisfied mobile terminal set, the an satisfied mobile terminal set comprising all mobile terminals in the available mobile terminal set allocated sufficient frequency resources to satisfy their minimum data rate constraints, the unsatisfied mobile terminal set comprising all mobile terminals in the available mobile terminal set allocated insufficient frequency resources to satisfy their minimum data rate constraints.

13. The base station of claim 12, wherein, in the Unconstrained Maximization phase of the method, the controller is operative to remove one or more mobile terminals from the allocation based on the minimum service requirement constraint test by:

if, after allocating frequency resources, the minimum service requirement constraint is not satisfied for any service engaged in by any mobile terminal in the active mobile terminal set, removing from both the auxiliary and the available mobile terminal sets a mobile terminal requesting substantial resources.

14. The base station of claim 13, wherein, in the Unconstrained Maximization phase of the method, the mobile terminal selected for removal is the mobile terminal having the lowest ratio between the average wideband channel quality and the required data rate.

15. The base station of claim 14, wherein in the Unconstrained Maximization phase of the method, the controller is further operative to:

if another mobile terminal engaged in the same first service as the removed mobile terminal can also be removed without violating the minimum service requirement constraint for the first service, repeat the Unconstrained Maximization phase of the method using the reduced available and auxiliary mobile terminal sets; and otherwise, remove all mobile terminals engaged in the first service from the auxiliary mobile terminal set and, if the auxiliary mobile terminal set is not empty, repeat the Unconstrained Maximization phase of the method using the reduced available mobile terminal set and further reduced auxiliary mobile terminal set.

16. The base station of claim 15, wherein, in the Unconstrained Maximization phase of the method, the controller is further operative to, if any mobile terminals remain in the available mobile terminal set that have their minimum data rate requirement satisfied:

define a donor mobile terminal set comprising all mobile terminals in the available mobile terminal set that have been allocated excess frequency resources over that required to satisfy their minimum data rate; and define a receiver mobile terminal set comprising all mobile terminals in the available mobile terminal set that do not have their minimum data rate requirement satisfied.

17. The base station of claim 16, wherein, in the Reallocation phase of the method, the controller is operative to reallocate frequency resources from one or more mobile terminals to one or more others by iteratively:

generating frequency resource reallocation combinations for a given frequency resource block size;

testing the frequency resource reallocation combinations for satisfaction of minimum data rate requirements for mobile terminals in the donor and receiver mobile terminal sets; and iteratively repeating the Reallocation phase with different bock sizes in response to the testing.

18. The base station of claim 17, wherein, in the Reallocation phase of the method, the generating frequency resource reallocation combinations comprises:

selecting a mobile terminal having the worst channel conditions from the receiver mobile terminal set; and if frequency resources are available for reallocation, generating one or more frequency resource reallocation combinations for a given block size; and calculating an efficiency metric for each frequency resource reallocation combination generated; and choosing the frequency resource reallocation combination having the highest metric.

19. The base station of claim 18, wherein, in the Reallocation phase of the method, the testing the frequency resource reallocation combinations comprises:

if the chosen frequency resource reallocation combination would result in the minimum data rate requirement of any mobile terminal in the donor mobile terminal set being unsatisfied:

discarding the chosen frequency resource reallocation combination; and selecting the frequency resource reallocation combination having the next highest metric; and if the chosen frequency resource reallocation combination results in the minimum data rate requirement of all mobile terminals in the donor mobile terminal set being satisfied:

if the chosen frequency resource reallocation combination fails to satisfy the minimum data rate requirement of the selected mobile terminal from the receiver mobile terminal set:

increasing the frequency resource block size; and generating frequency resource reallocation combinations for the new frequency resource block size; and if the chosen frequency resource reallocation combination satisfies the minimum data rate requirement of the selected mobile terminal from the receiver mobile terminal set:

updating the frequency resource allocation and donor and receiver mobile terminal data sets.

20. The base station of claim 19, wherein, in the Reallocation phase of the method, the controller is operative to, if any mobile terminal remains in the receiver mobile terminal set, repeat the Reallocation phase of the method until the receiver mobile terminal set is depleted or no solution is possible.

21. A computer program product stored in a non-transitory computer readable medium for allocating a first plurality of frequency resources among a second plurality of requesting mobile terminals, wherein each mobile terminal employs a service such that one or more services are represented in the second plurality, the frequency resource allocation satisfying all of an exclusivity constraint that each frequency resource is allocated to only one mobile terminal, an adjacency constraint that all frequency resources allocated to any given mobile terminal are contiguous in the frequency domain, and a minimum service requirement constraint that a predetermined number of the mobile terminals employing each service be granted a required data rate, the computer program product comprising software instructions which, when run on one or more processing circuits configured to function as a controller, causes the controller to:

in an Unconstrained Maximization phase of a method:

iteratively allocate frequency resources to the mobile terminals, obeying the exclusivity and adjacency constraints but without regard to the minimum service requirement constraint;

test the resulting allocation for fulfillment of the minimum service requirement constraint; and remove one or more mobile terminals from the allocation based on the minimum service requirement constraint test; and in a Reallocation phase of the method following the Unconstrained Maximization phase, reallocate frequency resources from one or more mobile terminals that have their required data rate fulfilled to one or more mobile terminals that do not have their required data rate fulfilled.

* * * * *